(No Model.)  2 Sheets—Sheet 1.

P. M. WEISEL.
DOUBLE ROW CORN PLANTER.

No. 526,646. Patented Sept. 25, 1894.

Witnesses:
J. B. McGirr.
Leonard H. Dyer.

Inventor.
Peter M. Weisel
by Francis L. Dyer,
Attorney (No Model.) 2 Sheets—Sheet 2.

P. M. WEISEL.
DOUBLE ROW CORN PLANTER.

No. 526,646. Patented Sept. 25, 1894.

Witnesses:
J. B. McGirr.
Leonard H. Dyer.

Inventor:
Peter M. Weisel
by Frank L. Dyer,
Attorney

UNITED STATES PATENT OFFICE.

PETER M. WEISEL, OF WILLIAMSPORT, PENNSYLVANIA.

DOUBLE-ROW CORN-PLANTER.

SPECIFICATION forming part of Letters Patent No. 526,646, dated September 25, 1894.

Application filed March 31, 1894. Serial No. 505,899. (No model.)

*To all whom it may concern:*

Be it known that I, PETER M. WEISEL, a citizen of the United States, residing at Williamsport, in the county of Lycoming and State of Pennsylvania, have invented certain new and useful Improvements in Double-Row Corn-Planters; and I do hereby declare the following to be a full, clear, and exact description of the invention, which will enable others skilled in the art to which it appertains to make and use the same.

My invention relates to improvements in double row corn planters, and is adapted for use in planting many other varieties of cereals in rows.

The object of the invention is to provide a device for this purpose which will be simple and economical in construction, which will operate with rapidity, and by means of which a definite quantity of fertilizer may be deposited in the furrow with the corn or other cereal that may be planted.

For a better comprehension of my invention, attention is directed to the accompanying drawings, forming a part of this specification, and in which—

Figure 1:
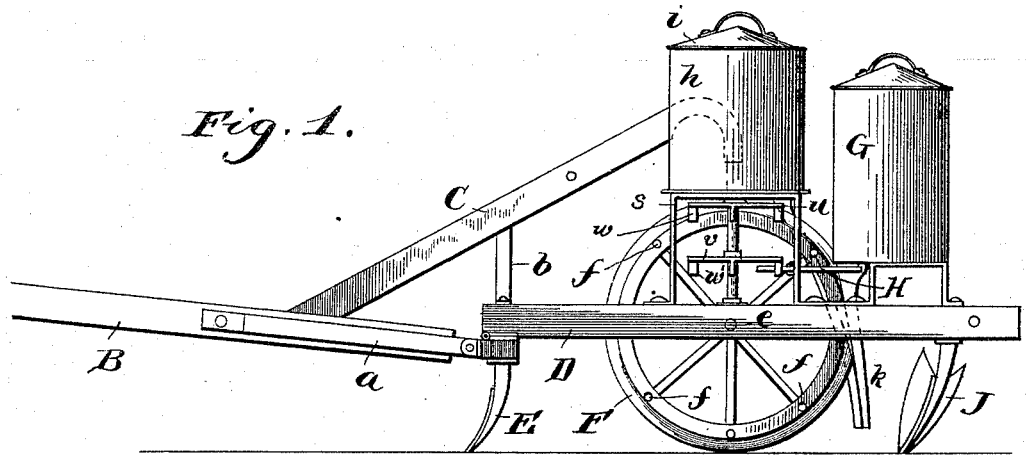
Figure 2:
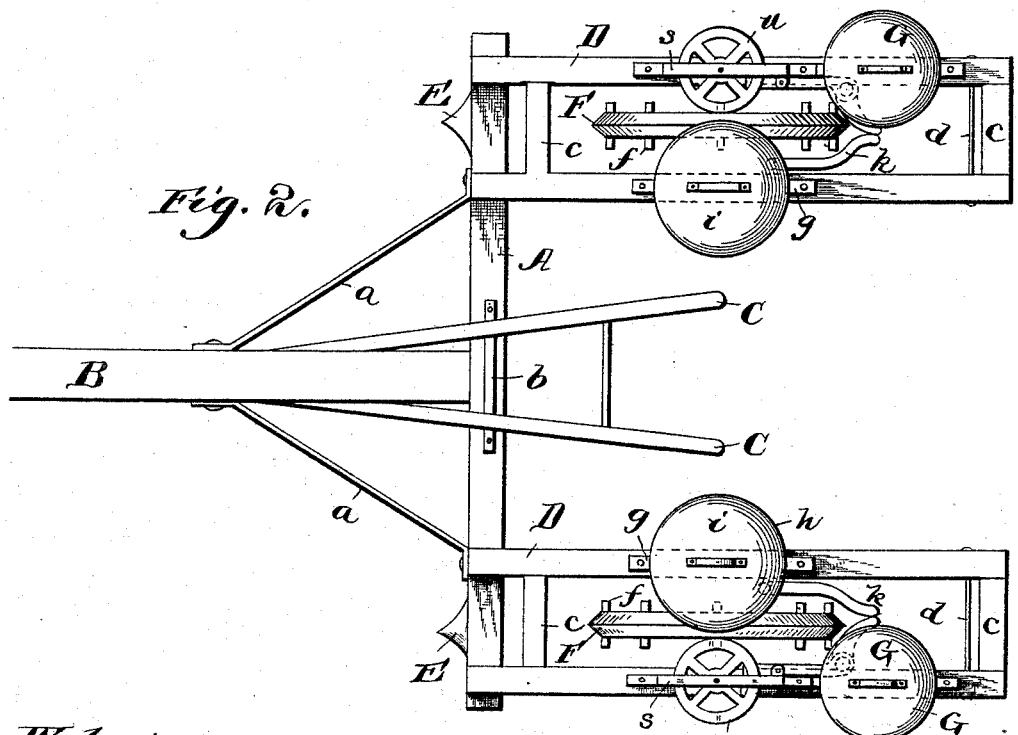
Figure 3:
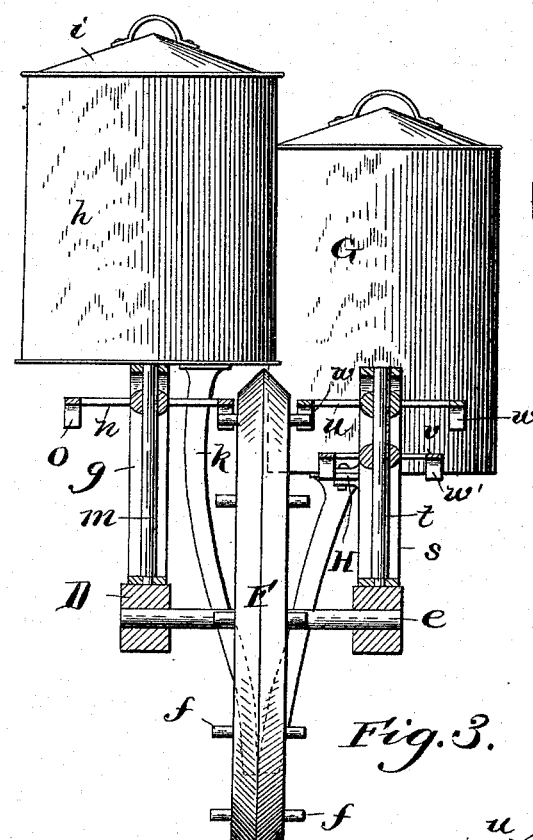
Figure 4:
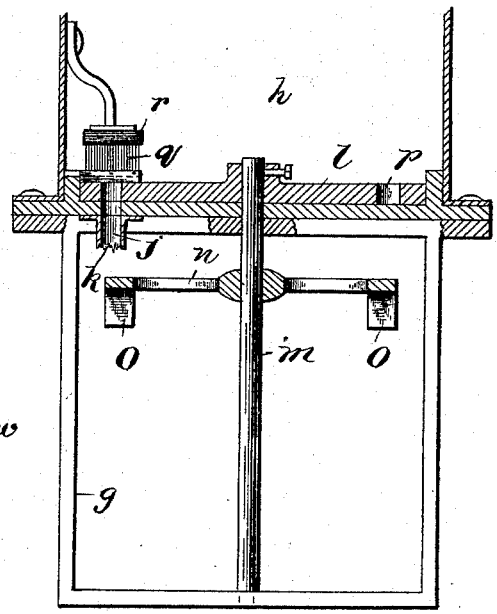
Figure 5:
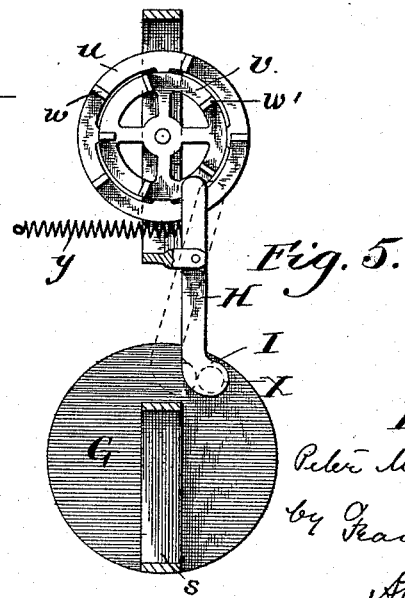

Figure 1 is a side elevation of my improved planter. Fig. 2 is a plan view thereof. Fig. 3, is a cross section of one side of the device; Fig. 4, an enlarged sectional view of the corn hopper, illustrating the manner of dropping corn therefrom; Fig. 5, a bottom view of the fertilizer hopper.

In all of the above views corresponding parts are designated by the same letters of reference.

A is the cross beam of the machine and B is the usual pole secured thereto and braced by means of the metal bracing rods $a$.

C, C, are the usual operating handles, secured at their forward ends to the pole B, and supported from the frame A, by the braces $b$.

The frame A, carries near each end the two longitudinal frames D, D, which are strengthened by cross frames $c$, $c$, and by tie rods $d$, $d$, of ordinary construction.

Secured to the cross beam A, at each end thereof and between each of the two frames D, D, is a plow E, of any suitable construction, which is used for cutting a furrow in which the corn is to be planted. By rigidly mounting these two plows E, to the cross beam A, the furrows cut by the same will be exactly parallel.

Mounted between the frames D, D, on axles $e$, on each side of the machine and traveling exactly in the furrows made by the plows E, are supporting wheels F, made as light as possible consistent with the necessary strength. These supporting wheels F, are provided with pins $f$, extending entirely through the rims thereof, as shown more particularly in Fig. 2.

Mounted on the inner side of frames D, is a metal supporting frame $g$, carrying the corn hopper $h$, provided with a removable cover $i$, for introducing corn therein. The particular construction of this corn hopper $h$, is shown in Fig. 4, to which attention is now directed. The bottom of the hopper $h$, is provided with an opening $j$, therein, from which a pipe or tube $k$, leads to the furrow behind each of the driving wheels F.

Mounted within the hopper $h$ at the bottom part thereof, is a disk $l$, supported on a shaft $m$, which passes through the bottom of the hopper and is provided at its lower end with a wheel $n$, which wheel carries the depending fingers $o$, of any desired number. The said disk $l$, is also provided with holes $p$, extending entirely through the same, which holes are adapted to be brought into successive coincidence with the opening $j$, in the bottom of the hopper. These holes $p$, in the disk $l$, correspond in number and location to the depending fingers $o$, of the wheel $n$.

Supported within the hopper $h$, directly above the opening $j$, therein, is a cut off brush $q$, consisting preferably of heavy bristles, as shown, secured to a metallic casting $r$, which is bolted or otherwise secured to the inside of the hopper.

When the parts are arranged for operation, the fingers $o$, of the wheel $n$, are adapted to be engaged by the outside ends of the pins $f$, which extend through the rims of the supporting wheels F, so that as the supporting wheels rotate, the pins $f$, will successively engage with the fingers $o$, and thereby will rotate the wheel $n$ a predetermined portion of a revolution, carrying with it, as will be obvious, the disk $l$, within the hopper $h$. I desire to have the parts so arranged that as each of the pins $f$, disengages from the fingers $o$, of the wheel $n$, one of the holes $p$, in the disk $l$ will be left in a position coincident with the hole $j$.

Extending up from the outer side of the frames D, are metallic supporting frames $s$, and mounted between each of the supporting frames $s$, and the inner supporting frame D, directly beneath it, is a vertical shaft $t$. This vertical shaft carries two wheels, $u$ and $v$, arranged one above the other. The upper wheel $u$, is provided with depending fingers $w$ corresponding to the fingers $o$, of the wheel $n$, which fingers are to be engaged by and moved by means of the inner ends of the pins $f$, which are carried by the supporting wheels F. The lower wheel $v$, on each of the vertical shafts $t$, is provided with pins $w'$, corresponding preferably in number and location to the pins on the wheel $u$, which pins $w'$, extend downward from the periphery of the wheel $v$ and operate in a plane immediately above the inner frames D.

Mounted upon each of the outer sides of the frames D, is a fertilizer hopper G, for containing phosphate or any other suitable fertilizer. Each of the hoppers G, is provided in its bottom with a hole X, with which a tube connects, its lower end entering the furrow made by the plows E. It is obvious that the tube which conveys the fertilizer from each hopper G, may be connected with the tube $k$ of the corn hopper carried on the same side of the machine with it, so that a common distributing mouth or pipe may be used for both.

Mounted on the outer sides of the frames D, beneath each fertilizer hopper G, is a lever H, provided at its inner end with a flat shutter I, adapted to normally close the opening X, in the bottom of the hopper G, being held in this normal position by means of a spring $y$. The other end of each lever H, is so arranged that it will be engaged by the depending fingers $w'$, which are carried on each wheel $v$, so that the fingers $w'$ will cause the lever H to be moved, thereby allowing a portion of the fertilizer to flow out from each hopper G, through the opening X.

At the extreme rear end of each of the frames D, is a small covering plow J, which is of such a construction that the furrows opened by the plows E, will be closed by the plows J, after the corn from the hopper $h$, and fertilizer from the hopper G, have been deposited in such furrows.

The operation of my improved corn planter is as follows: The plows E, passing through the ground, will form two parallel furrows, in which the supporting wheels F, will travel. These supporting wheels F, in rotating, will cause the wheels $n$ and $u$ to be intermittently moved as each pin $f$ engages with the depending fingers $o$ and $w$, respectively. It being supposed that the hopper $h$ is filled wholly or partially with corn, it will be seen that the holes $p$, in the disk $l$, will also be filled with corn. As each of these holes $p$, passes under the cut off brush $q$, so as to be coincident with the opening $j$, in the bottom of the hopper, all the corn immediately around this particular hole $p$, will be brushed away, so that the only corn which flows into the furrows through the pipe or tube $k$, will be that which was contained in this particular opening $p$. In this way only a small quantity of corn will be deposited in the furrow at one time, so that there is no waste; and by adjusting the size of the hole $p$, as by means of bushings of different sizes inserted within the said hole the quantity of corn necessary to be planted can be easily and accurately regulated. At the same time that the corn hopper mechanism is operating, the pins $f$, on the supporting wheels F, are rotating the wheels $u$, which wheels carry with them the lower wheels $v$. The pins $w'$, on the wheels $v$, engage, as before stated, with the free ends of the levers H, and said levers are moved in this way intermittently back and forth, so that the opening X in the bottom of each hopper G will be successively opened and closed. In this way a small quantity of fertilizer from each of the hoppers G, will be deposited in the furrows formed by the plows E, with the corn which is planted therein. The corn and fertilizer being thus deposited in these furrows, the plows J, at the end of the machine will cover the furrows, and the operation will be completed.

Having now described my invention, what I claim as new therein, and desire to secure by Letters Patent, is as follows:

1. In a corn planter, the combination of the supporting wheels F; pins $f$, in the periphery thereof; a corn hopper $h$, mounted above and to one side of the supporting frame, and an opening $j$, in the hopper $h$; a disk $l$, within the hopper and mounted on a shaft $m$; opening $p$, in said disk; a stationary cut off brush $q$, above the opening $j$; a wheel $n$, carried by the shaft $m$, and depending fingers $o$ on said wheel $n$, adapted to engage with the pins $f$ substantially as described.

2. In a corn planter, the combination of a supporting wheel, pins $f$ on the periphery thereof; a corn hopper $h$ supported above and to one side of the wheel F; an opening $j$ in the bottom of said hopper; cut off mechanism within said hopper and above said opening $j$, a shaft $m$ for operating the said mechanism; a wheel $n$ on the shaft $m$; depending fingers $o$, engaging with the pins $f$; hopper G carried by the machine; an opening X in the bottom of the hopper G; a lever H pivoted beneath the said hopper and carrying a shutter for normally closing said opening, a shaft $t$ and connections between said shaft and the lever H and between said shaft and the supporting wheel F, substantially as described.

3. In a corn planter, the combination of a frame; the plows E, carried by said frame at or near each end thereof; a supporting wheel F, on each side of the frame in line with the plows E; pins $f$, on the periphery thereof; a corn hopper $h$, supported above and to one side of the wheel F; an opening $j$ in the bottom of said hopper; cut off mechanism within said hopper and above said opening $j$, a shaft $m$ for operating the said mechanism; a wheel $n$, on the shaft $m$; depending fingers $o$, engaging with the pins $f$; a hopper G; a lever H pivoted beneath the said hopper and carrying a shutter for normally closing said opening, a shaft $t$, and connections between said shaft and the lever H, and between said shaft and the supporting wheel F, and plows J on each side of the machine for closing the furrows made by the plows E, substantially as described.

In testimony whereof I affix my signature in presence of two witnesses.

PETER M. WEISEL.

Witnesses:
 LEONARD HODGES,
 A. G. REESE.